(12) United States Patent
Turner et al.

(10) Patent No.: US 8,125,113 B2
(45) Date of Patent: Feb. 28, 2012

(54) SLOT WEDGES FOR ELECTRICAL MACHINES

(75) Inventors: Michael James Turner, Leeds (GB); Simon David Gibson, Knaresborough (GB)

(73) Assignee: Nidec SR Drives Ltd., North Yorkshire (GB)

(*) Notice: Subject to any disclaimer, the term of this patent is extended or adjusted under 35 U.S.C. 154(b) by 0 days.

(21) Appl. No.: 12/570,776

(22) Filed: Sep. 30, 2009

(65) Prior Publication Data

US 2010/0079028 A1   Apr. 1, 2010

(30) Foreign Application Priority Data

Sep. 30, 2008  (GB) .................................. 0817900.4

(51) Int. Cl.
  H02K 3/48   (2006.01)
  H02K 3/34   (2006.01)
  H02K 1/06   (2006.01)
  H02K 5/00   (2006.01)

(52) U.S. Cl. ................ 310/214; 310/215; 310/216.058; 310/416

(58) Field of Classification Search .................. 310/214, 310/215, 186, 213, 216.004, 216.058, 254.1, 310/416
See application file for complete search history.

(56) References Cited

U.S. PATENT DOCUMENTS

| | | | | |
|---|---|---|---|---|
| 2,283,146 A | * | 5/1942 | Zoller | 310/214 |
| 2,316,635 A | * | 4/1943 | Staak | 310/214 |
| 2,581,445 A | * | 1/1952 | Riley, Jr. et al. | 310/233 |
| 3,465,188 A | * | 9/1969 | Sisk | 310/216.004 |
| 3,787,132 A | * | 1/1974 | Garnett | 403/290 |
| 5,300,846 A | | 4/1994 | Miller | |
| 6,121,708 A | * | 9/2000 | Muller | 310/214 |
| 6,570,291 B1 | * | 5/2003 | Spaggiari | 310/214 |
| 2008/0203844 A1 | * | 8/2008 | Klaussner | 310/214 |

FOREIGN PATENT DOCUMENTS

| | | |
|---|---|---|
| EP | 0 006 514 A1 | 1/1980 |
| JP | 2001-25197 | 1/2001 |
| JP | 2001025197 A * | 1/2001 |

OTHER PUBLICATIONS

MAchine Translation JP2001025197 (2001).*
Combined Search and Examination Report dated issued by the Great Britain Patent Office in British Patent Application No. 0817900.4, Jan. 5, 2010 (6 sheets).

* cited by examiner

Primary Examiner — Quyen Leung
Assistant Examiner — Jose Gonzalez Quinones
(74) Attorney, Agent, or Firm — Haynes and Boone, LLP (57) ABSTRACT

A wound core assembly for an electrical machine comprising a stack of laminations defining a core having a plurality of poles, the wound core assembly further comprising at least one slot wedge, wherein the slot wedge comprises a first portion arranged between adjacent poles and at least one second portion protruding from the first portion and abutting an end face of the core in the region of at least one of the poles. The at least one second portion may apply axial pressure to the end face to reduce the tendency of the laminations to splay axially outwards.

20 Claims, 5 Drawing Sheets

SLOT WEDGES FOR ELECTRICAL MACHINES

The present application generally relates to the design and construction of a wound core assembly for an electrical machine.

Electrical machines in general are constructed from laminations of electrical sheet steel, the resulting structure being used to carry the magnetic flux on which the machine depends for its operation. The structure is laminated to reduce the effect of eddy currents, which flow in the steel due to the time rate of change of the flux. Usually only machines with unvarying flux have unlaminated structures. For example, the field structure of a dc machine can be unlaminated (i.e. made of solid metal), though even in these machines a laminated structure is often adopted in order to improve the transient response when the machine moves to a new operating condition. The degree of lamination is usually based on the frequency of flux variation in the machine. For example, in a machine energised directly from the 50 or 60 Hz mains supply and operating at, say, 1500 or 1800 rev/min, a lamination thickness of 0.50 or 0.65 mm is often adopted. For a machine operating on a 400 Hz supply and running at 12000 rev/min, a lamination thickness of 0.20 mm might be selected.

The laminations are stacked to provide a pack or core of the desired length, the stationary laminations forming the stator core and the moving laminations forming the rotor core. While the wound core assembly disclosed herein will be described for convenience in terms of a rotating machine, the principles of this wound core assembly are equally applicable to a linear machine having a stator in the form of a track and a moving part moving along it. The word "rotor" is used in the art to refer to the movable part of both rotating and linear machines and is to be construed herein in this way. Accordingly, the following descriptions of several examples are made by way of explanation and not for the purposes of limitation to rotating systems.

The laminations forming a core have to be held securely together, not only to facilitate subsequent assembly of the required windings of the machine, but also to minimise vibration when the machine is used. Vibration leads to acoustic noise and degradation of the insulation of the winding. A number of techniques have been evolved to hold the packs together, some of which are more suited to small machines, some to volume production of machines, others to small numbers in a production run.

Figure 1:
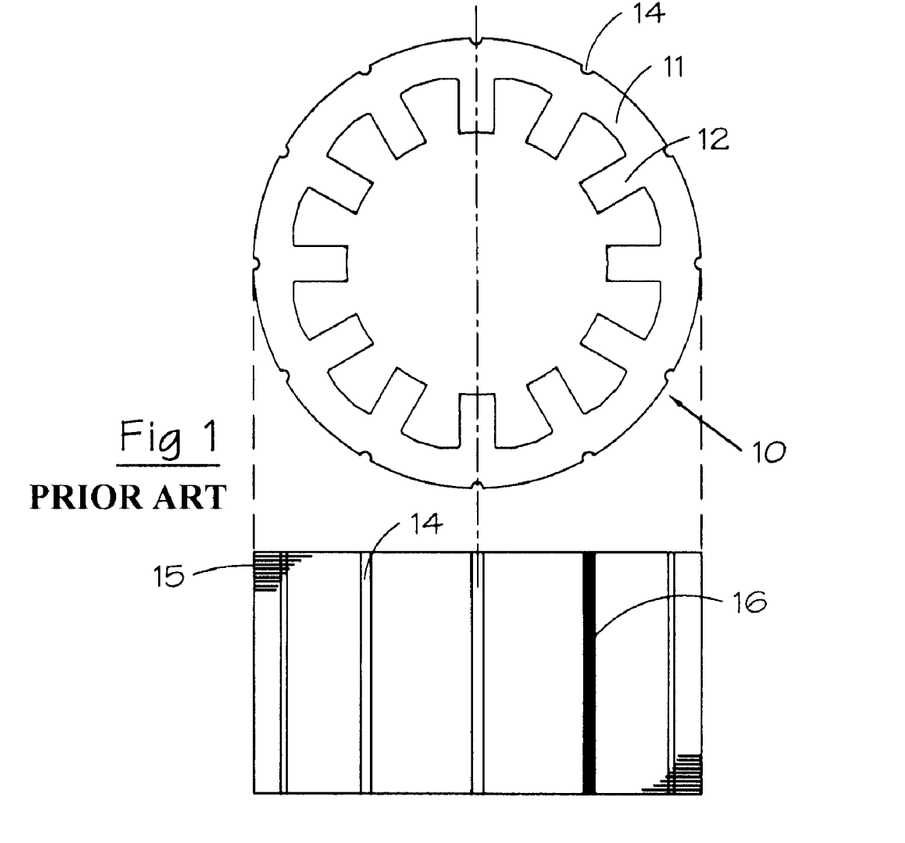
FIG. 1 shows a core of a known machine.

One common method is shown in FIG. 1, where a bundle of laminations 15 are stacked to form a core 10. Each of the laminations defines a back-iron section 11 and a number of radially protruding teeth or poles 12. The outside of the core 10 is provided with notches or grooves 14, into which axial runs of weld 16 are made. The laminations are thus securely held together. This technique is common, as it can be carried out manually or by automated means. During welding, the pack of laminations is held together in a clamp. This technique is most often used on stator cores, since it is more difficult to access the inside of the bore of the rotor.

One of the difficulties with this technique is that when the welds cool, they contract and the resulting tension in the core tends to make the poles 12 of the laminations near the end of the core splay outward when the clamps are removed. For example, referring to FIG. 1, the laminations at the outside ends of the core would be under tension at an outer edge due to the contracted weld in the grooves 14. This tension causes the laminations to be pulled apart in the region of the pole sections, the separation increasing towards the tip of the pole. This separation of the laminations can make the subsequent insulation of the winding of the wound core assembly more difficult. Further, the separation of the laminations in the region of the poles may compound the problem of vibration of the laminations during operation. This vibration can cause metal fatigue and can also abrade the insulation of the winding arranged around the poles, eventually leading to a short circuit and failure of the machine.

Another method of holding the pack together is by cleating, in which strips of, for example, mild steel, are forced into dovetail-shaped slots around the outer diameter of the core and their ends bent over the ends of the core. While this method avoids the problems of the welds contracting, the laminations may still vibrate in the pole regions due to lack of appropriate support.

Figure 2:
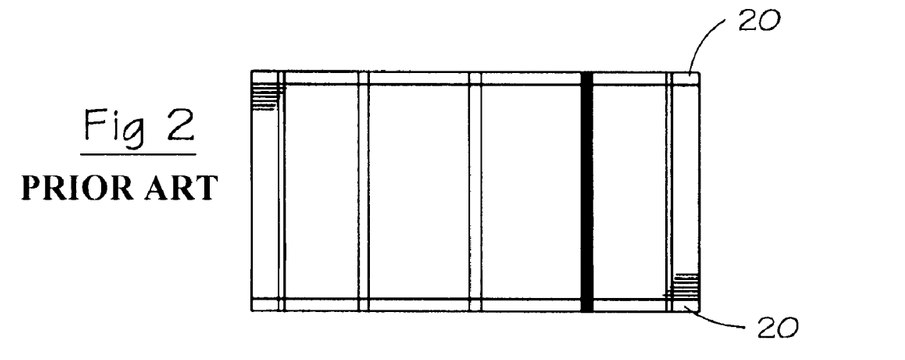
FIG. 2 shows a core with end plates.

To support the tips of the end laminations, it is known to incorporate supporting plates 20 at the ends of the core, as shown in FIG. 2. These plates are typically several times the thickness of the individual laminations and are usually included in the run of weld, so that they are secured to the pack of laminations and support the end laminations. However, if they are made of mild steel, which is generally chosen for ease of machining and cost-effectiveness, they are prone to carry fringing flux and therefore suffer from significant iron losses. These iron losses can reduce the efficiency of the machine. Furthermore, like the laminations themselves, these plates may still splay outwards after welding (for the same reasons) and so can be less effective than expected.

There is therefore a need for a simple way of addressing one or more of the above disadvantages of supporting the laminations in the wound core assembly of an electrical machine.

The present invention is defined in the accompanying independent claims. Further, optional features of embodiments of the invention are recited in the claims respectively dependent thereon.

According to an embodiment of the invention, there is provided a wound core assembly comprising a stack of laminations defining a core having a plurality of poles, the wound core assembly further comprising at least one slot wedge, wherein the slot wedge comprises a first portion arranged between adjacent poles and at least one second portion protruding from the first portion and abutting an end face of the core.

Embodiments of the present invention provide a core having slot wedges secured between adjacent poles which support the laminations of the wound core assembly in the region of the poles. This support can prevent vibration of the laminations in operation of the electrical machine of which the wound core assembly is a part, extending the operating life of the electrical machine. Further, this support can prevent splaying of the laminations, making it easier to insulate the wound core assembly.

The slot wedge may have only one second portion, such that the slot wedge is substantially "L" shaped. The second portion of such a slot wedge may be arranged to engage the end face of one pole.

The slot wedge may have at least two second portions. The at least two second portions may extend from opposite sides of the slot wedge such that the slot wedge is substantially "T" shaped. This slot wedge may be symmetrical about a centre line. The second portions of such a slot wedge may engage the end face in the region of two adjacent poles.

An edge of the first portion may have an interference fit with a side of the pole. An edge of the second portion may apply pressure to the end face in the region of the pole. The edge of the second portion may be arranged at a right angle to the edge of the first portion.

The slot wedge may be a unitary piece of material or the slot wedge may be constructed from more than one piece of material. The slot wedge may comprise a first piece defining the first portion and a second piece defining the second portion, wherein the first piece is attached to the second piece.

The slot wedge may comprise an insulating material. The insulating material may comprise a glass-reinforced epoxy resin.

The junction between the first portion and the second portion may define a recess.

According to an embodiment of the present invention, there is further provided a method for assembling a wound core assembly for an electrical machine, the assembly comprising a stack of laminations defining a core having a plurality of poles, the space between adjacent poles defining a slot, the method comprising inserting a slot wedge into the slot such that the slot wedge is secured between the adjacent poles, wherein the slot wedge has at least one protruding portion arranged to support an end face of the core.

Other aspects and advantages of the apparatus disclosed herein will become apparent upon reading the following detailed description of examples of a wound core assembly and upon reference to the accompanying drawings, in which.

Figure 3:
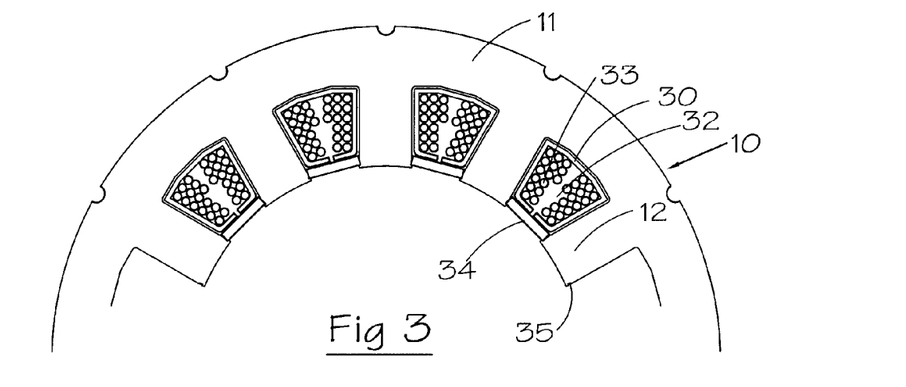
FIG. 3 shows a part section of a wound core assembly.

FIG. 3 shows a part section of a stator core 10 of an electrical machine. The profile of the core 10 defines a circumferential back iron part 11 and a plurality of radially inwardly projecting poles 12. The core is made by stacking a plurality of laminations together. The core comprises a stack of radial laminations of electrically magnetizable steel, each defining the core profile. The centres of the laminations form the axis of the core and the axially outward facing faces of the first and last lamination of the stack each define an end face of the core.

Figure 4:
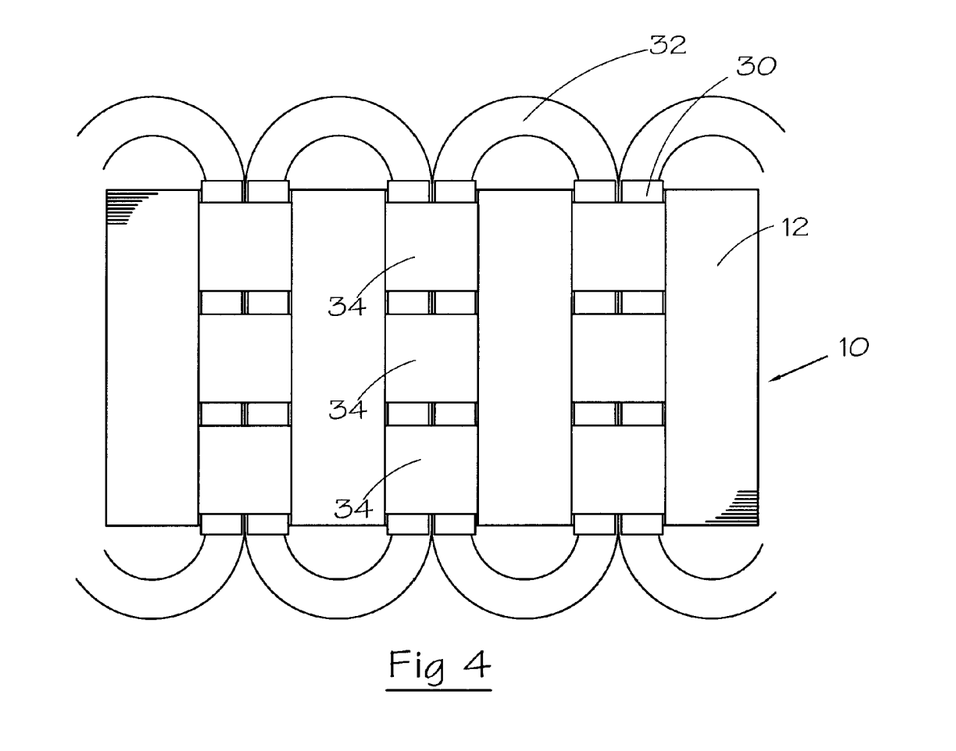
FIG. 4 shows a developed schematic of the wound core assembly of FIG. 3.

The perimeter of each slot is generally insulated with a slot liner 30 made from a sheet of insulating material. Coils 32 of several turns 33 of insulated wire inserted into the appropriate slots are connected to form phase windings. To hold the windings securely in the slots, slot wedges 34 are inserted at the mouth of the slot between the pole tips. Slot wedges are known by the alternative term "top sticks". The slot wedge 34 may be one piece, approximating to the axial length of the core, or may be in several axial sections, to aid their installation. The slot wedges are usually retained in position by being placed under the overhanging ends of the poles or, as shown in FIGS. 3 and 4, by fitting into notches 35 in the sides of the poles 12. Conventionally, the entire wound core assembly is coated with an insulating varnish, which helps to stabilise the winding and also bonds together all of the many components of the insulation system.

FIG. 4 shows a schematic of a developed view of the wound core assembly of FIG. 3, looking from the centre of the core bore. The slot wedges 34 in this case are in three sections, but any number could be chosen, depending on the length of the core.

Figure 5:
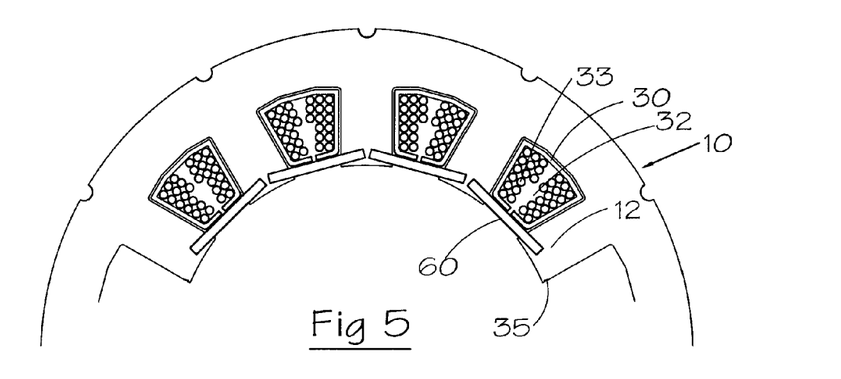
FIG. 5 shows a wound core assembly having T-shaped slot wedges.
Figure 6:
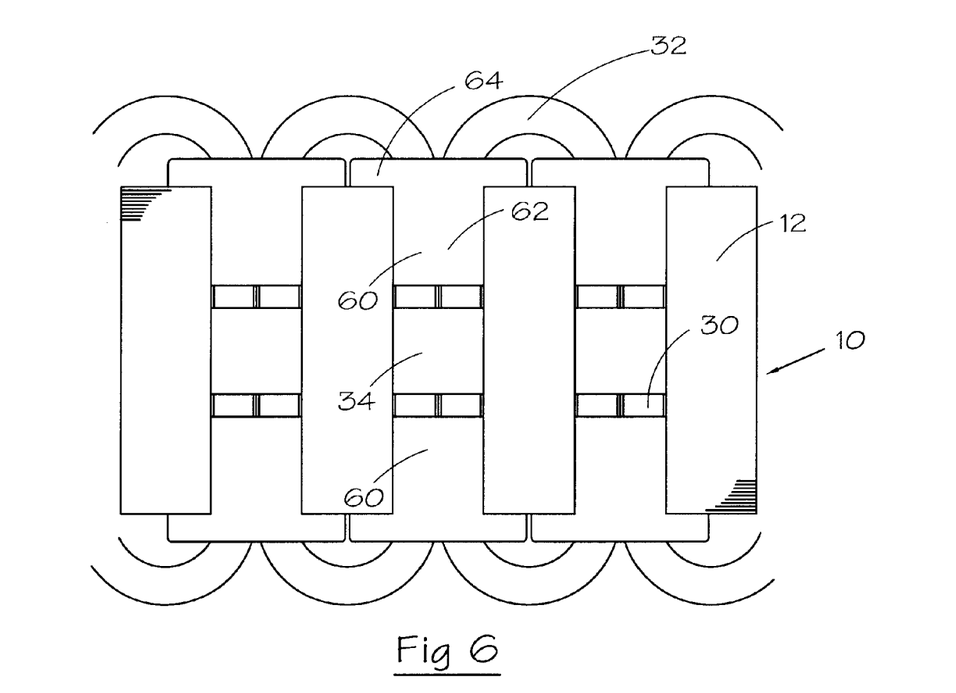
FIG. 6 shows a developed schematic of the wound core assembly of FIG. 5.

FIG. 5 shows a wound core assembly having T-shaped slot wedges, in accordance with one aspect of the invention. The wound core assembly, including slot liners and coils may be as in FIG. 4, but the slot wedges 60 are a different shape and combine two functions. As seen more clearly in the developed view of the core shown in FIG. 6, the slot wedges 60 at the ends of the core are shaped in the form of a T, with the central portion 62 locating in the notches 35 in the sides of the pole. The lateral width of this central portion 62 is chosen to be an interference fit between the sides of the poles. The length of the central portion 62 is selected according to the length of the core and whether or not intermediate standard slot wedges 34 are used. As shown in FIG. 6, one intermediate standard slot wedge 34 is used and two T-shaped slot wedges 60 are used, one inserted from each end of the core. With this arrangement, the central portion 62 is a little less than one third of the core length. Other arrangements for the length are clearly possible, as will be understood by those skilled in the art.

A cross piece 64 of the T extends across the outward facing face of the end lamination (which defines an end face of the core), as shown in FIGS. 5 and 6, and the slot wedge 60 is pressed into a position such that the cross piece 64 exerts pressure on the end lamination to hold it in its correct position against the rest of the core.

This design of the slot wedge 60 is an improvement on the basic slot wedge because it both retains the winding in the slot and, in addition, holds the outer laminations in place. The cross piece 64 may also be used to at least partly support the end winding of the coil. Once all the windings and wedges are assembled, the wound core assembly can be impregnated with insulating varnish in the conventional way. This bonds all the components together.

A suitable material for the wedge is glass-reinforced epoxy resin to the NEMA G11 standard, for example Pyrotek TS-111, but other similar rigid non-magnetic materials with similar structural strength will be appropriate.

It is possible to make the T-shape of the slot wedge asymmetrical, i.e., the crosspiece 64 need not extend symmetrically either side of the central portion 62.

The sides of a slot are defined by a plurality of laminations 15. Due to manufacturing tolerances, the edges of the laminations 15 will likely not line up perfectly. Typically, there is some variation in position of the side of a lamination 15 along the side of a slot. That is, some laminations will protrude into the slot further than other laminations. Such a variation results in the side of the slot having an irregular, serrated surface. Any such serration assists in securing and retaining the slot wedge in the slot. A well secured slot wedge is beneficial when the slot wedge is used to support one or more splayed end laminations.

Figure 7:
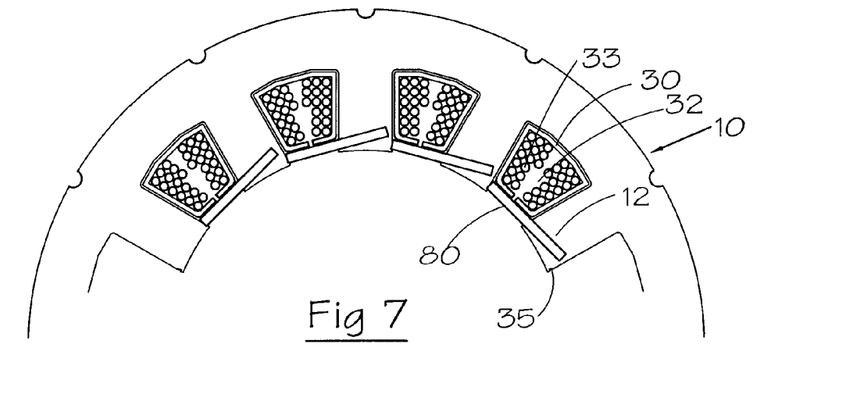
FIG. 7 shows a wound core assembly having L-shaped slot wedges.
Figure 8:
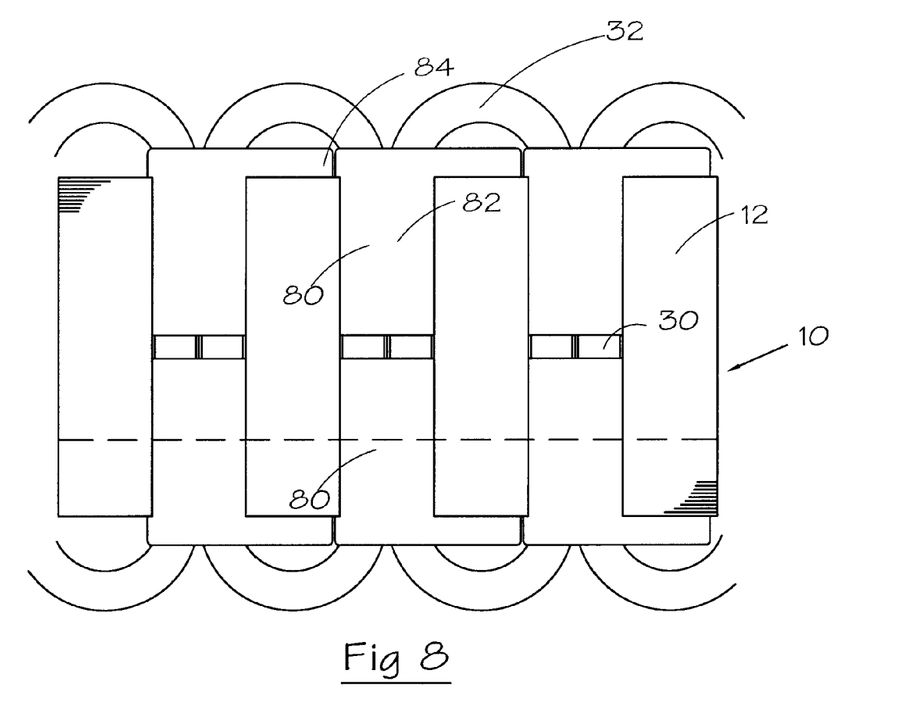
FIG. 8 shows a developed schematic of the wound core assembly of FIG. 7.

A wound core assembly having L-shaped slot wedges is shown in FIGS. 7 and 8. The central portion 82 of the L-shaped slot wedge fulfils the same function as in the previous example. A limb 84 extends to one side only and presses against the face of only one lamination. This L-shaped slot wedge has the advantage that the shape may "nest" or tessellate better when making a number of wedges from a sheet of raw material, thus saving on material cost.

Figure 9:
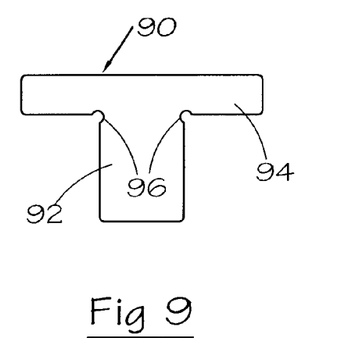
FIG. 9 shows a T-shaped slot wedge.
Figure 10:
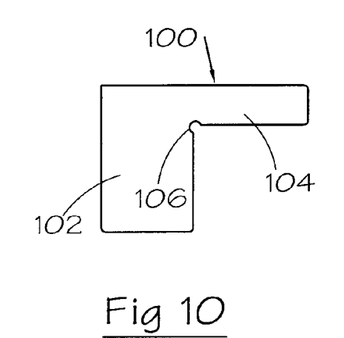
FIG. 10 shows an L-shaped slot wedge.

FIGS. 9 and 10 show further forms of T-shaped and L-shaped slot wedges. The T-shaped slot wedge 90 of FIG. 9 has a central portion 92 and a cross piece 94. The junction between the central portion 92 and each limb of the cross piece 94 is formed as a radiussed longitudinally extending recess 96. Similarly, the L-shaped slot wedge 100 of FIG. 10 has a radiussed longitudinally extending recess 106 at the junction between the central portion 102 and limb 104.

The recesses 96, 106 are for accommodating edge burrs and any other manufacturing edge defects in the laminations of the core. For example, if the laminations are manufactured by stamping, then a curved surface may be created on one face of the lamination due to the stamping force. This curved surface could prevent a slot wedge without a recess from seating properly against the top surface of the pole. The recesses 96 and 106 overcome this problem.

The slot wedges can be cut out from a sheet of material by a stamping process such as fine blanking or by routing. However, a sharp internal corner is difficult to produce by a stamping or routing process. Accordingly, the recesses 96 and 106 also allow the slot wedges 90 and 100 to be more readily produced. The skilled person will realise that the recess need not be radial in form but can be any easily produced shape which functionally gives relief at the internal corner of the slot wedge.

Figure 11:
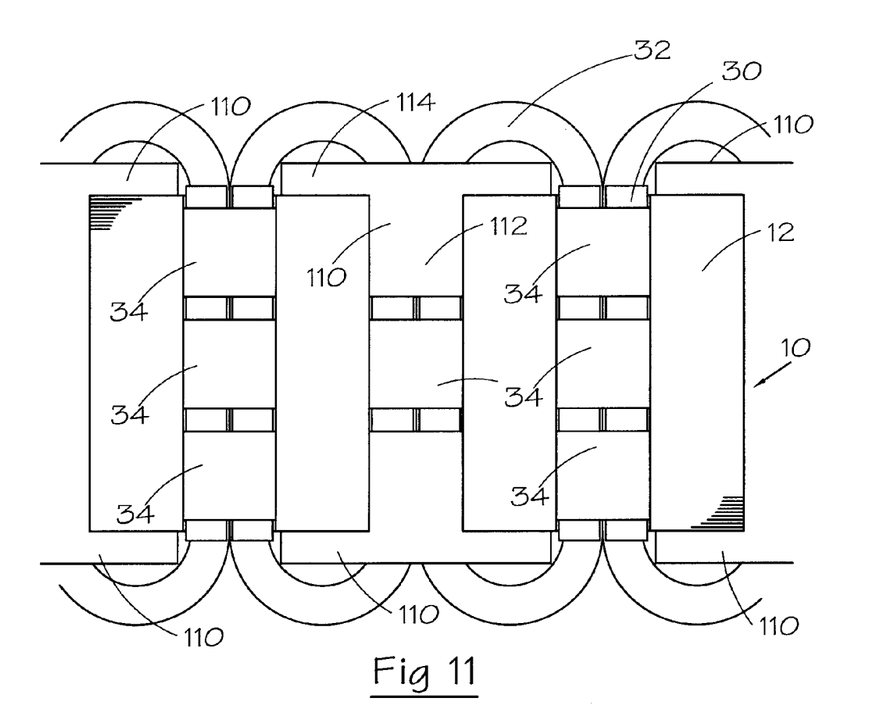
FIG. 11 shows a further example of a wound core assembly having T-shaped slot wedges.

A further example of a wound core assembly having T-shaped slot wedges is shown in FIG. 11. In this example, two types of slot wedges are used at the ends of the slots: a first type 34 has a standard shape with no cross piece, and a second type 110 is T-shaped. The T-shaped slot wedge 110 has a central portion 112 and a cross piece 114. The cross piece 114 fulfils the same function as in the previous embodiments. However, in this example T-shaped slot wedges 110 are used in alternate slots with standard shaped slot wedges 34 used in the slots in between. The cross piece 114 is shown as extending substantially all the way across an end face of each adjacent pole 12. In alternatives, the cross piece 114 of the slot wedge 110 may extend all the way or only part way, for example halfway or more or less than halfway, across the end face of the pole 12. Further, the slot wedge 60 of FIGS. 5 and 6 may be used in an alternating configuration in accordance with this example. This example has the advantage that a greater number of standard slot wedges 34 can be used, reducing manufacturing cost.

In FIG. 11, T-shaped slot wedges 110 are shown used in both ends of a particular slot, with both ends of the adjacent slots having standard slot wedges 34. In an alternative to this arrangement a particular slot has a T-shaped slot-wedge 110 at a first end of the core, with a standard slot wedge 34 at the other, second end of the core. In this arrangement, the slots adjacent the particular slot have T-shaped slot-wedges 110 at the second end of the core, with standard slot wedges 34 at the first end of the core. In this way, each slot has a T-shaped slot wedge 110 at only one end, with adjacent slots having T-shaped slot wedges 110 at an opposite end.

The T-shaped and L-shaped slot wedges are shown in the drawings as comprising a unitary piece of material. Alternatively, the slot wedges may comprise a first and second piece of material fixed together by some mechanical or bonding means. The T-shaped and L-shaped slot wedges have a central portion and a cross piece. One way of fabricating such a slot wedge is to cut the desired shape from a sheet of material. Such a cut may be preformed by way of a stamping process. Another way would be to mould the desired shape as a unitary item. However, yet another way to create the desired shape is to separately create a central portion and a cross piece, a limb, or a pair of limbs and then to attach the two portions together. The portions may be attached by way of a mechanical fixing means such as nuts and bolts or rivets, or by bonding such as welding or using an adhesive. These manufacturing methods may be equally applied to the T-shaped and L-shaped slot wedges disclosed herein.

The examples of the wound core assembly disclosed herein are shown with either 2 or 3 slot wedges per slot. In alternatives, any number of slot wedges could be used per slot, the choice usually determined by the length of the core.

The slot wedges disclosed herein apply also to inverted machines, i.e., those machines where the rotor revolves around the outside of a stator having radially outwardly extending poles. In this arrangement, the stator core is usually welded or cleated at points around an inner diameter, the outer diameter forming one side of the working airgap of the machine. In such a machine the slot wedges disclosed herein are used to support the ends of the laminations near this outer diameter.

The skilled person will appreciate that variation of the disclosed arrangements is possible without departing from the scope of the claims. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A wound core assembly for an electrical machine, the wound core assembly comprising a stack of laminations secured together to define a core having a plurality of poles, the poles each having a first end at which they are connected to the remainder of the core and having an opposed second end, the wound core assembly further including a plurality of slot wedges made from an insulating material, wherein each one of the plurality of slot wedges includes a first portion disposed with an interference fit between adjacent poles adjacent their second ends to define a space for a winding between the slot wedge and the core and includes at least one second portion protruding from the first portion and applying pressure to an end face of the core in the region of one of the poles that is adjacent thereto, wherein the pressure provided by the plurality of slot wedges substantially prevents splaying of a lamination at each end face and holds the lamination in its correct position against the core.

2. A wound core assembly according to claim 1, wherein the slot wedge has one single second portion.

3. A wound core assembly according to claim 1, wherein the slot wedge is substantially "L" shaped.

4. A wound core assembly according to claim 1, wherein the slot wedge is arranged to engage the end face only in the region of one single pole.

5. A wound core assembly according to claim 1, wherein the slot wedge has at least two of the second portions.

6. A wound core assembly according to claim 5, wherein the at least two second portions extend from opposite sides of the slot wedge.

7. A wound core assembly according to claim 1, wherein the slot wedge is substantially "T" shaped.

8. A wound core assembly according to claim 7, wherein the slot wedge is symmetrical about a centre line.

9. A wound core assembly according to claim 5, wherein the second portions engage the end face in the region of two of the poles.

10. A wound core assembly according to claim 1, wherein the slot wedge is a unitary piece of material.

11. A wound core assembly according to claim 1, wherein the slot wedge is constructed from more than one piece of material.

12. A wound core assembly according to claim 1, wherein the slot wedge comprises a glass-reinforced epoxy resin.

13. A wound core assembly according to claim 1, in which the junction between the first portion and the second portion defines a recess.

14. A wound core assembly according to claim 1, further comprising a plurality of windings.

15. A method for assembling a wound core assembly for an electrical machine, the assembly including a stack of laminations defining a core having a plurality of poles, a space between adjacent poles defining a slot, wherein the method comprises securing the laminations together to form the stack and then inserting a plurality of slot wedges into the slots, each one of the plurality of slot wedges made from an insulating material and having at least one protruding portion into the slot such that the slot wedge is secured with an interference fit between adjacent poles and the at least one protruding portion applies pressure to an end face of the core to support the end face, wherein the pressure provided by the plurality of slot wedges substantially prevents splaying of a lamination at each end face and holds the lamination in its correct position against the core.

16. A method as claimed in claim 15 including disposing a portion of a winding for the wound core assembly in the slot prior to inserting the slot wedge.

17. A wound core assembly according to claim 1, wherein the stack of laminations is welded or cleated together.

18. A method as claimed in claim 15, wherein the securing the laminations together includes welding or cleating the laminations together.

19. A wound core assembly according to claim 1, wherein there is at least one of the slot wedges disposed between each pair of poles of the core.

20. A method as claimed in claim 15, wherein the inserting comprises inserting at least one of the slot wedges having at least one protruding portion into the slot between each pair of poles of the core such that each of the slot wedges is secured with an interference fit between adjacent poles and the at least one protruding portion applies pressure to an end face of the core to support the end face.

* * * * *

UNITED STATES PATENT AND TRADEMARK OFFICE
CERTIFICATE OF CORRECTION

| | | |
|---|---|---|
| PATENT NO. | : 8,125,113 B2 | Page 1 of 1 |
| APPLICATION NO. | : 12/570776 | |
| DATED | : February 28, 2012 | |
| INVENTOR(S) | : Michael James Turner et al. | |

It is certified that error appears in the above-identified patent and that said Letters Patent is hereby corrected as shown below:

In Column 7, lines 16-17, please delete the words "into the slot".

Signed and Sealed this

Seventeenth Day of April, 2012

David J. Kappos
*Director of the United States Patent and Trademark Office*